United States Patent Office 3,440,208
Patented Apr. 22, 1969

3,440,208
FLOOR TILE COMPOSITIONS CONTAINING BLENDS OF STEREOREGULAR POLYOLEFINS AS THE BINDER
Andrew J. Foglia, Brooklyn, N.Y., and Joseph J. Feiter, Jr., Clifton, N.J., assignors to Mobil Oil Corporation, a corporation of New York
No Drawing. Filed July 6, 1965, Ser. No. 469,855
Int. Cl. C08f 29/02, 45/16
U.S. Cl. 260—41                                     4 Claims

ABSTRACT OF THE DISCLOSURE

A floor tile molding composition, contains, by weight, 60–85% fillers, fibrous matter, and pigments and 40–15% binder. The binder is a blend of stereoregular polybutene-1 (5–95%) with stereoregular polypropylene (5–50%) or a stereoregular copolymer of butene-1 and ethylene containing 1–30 weight percent ethylene (95–5%), or both.

---

This invention relates to floor covering compositions. It is more particularly concerned with floor tiles and the like having a blended polyolefin binder.

Floor tiles have become increasingly popular as floor coverings. Such tiles are characterized by toughness, hardness, and durability. It is also important that the binder used should be relatively inexpensive. Accordingly, low-cost rubber and vinyl resins have been proposed as binders in floor tile compositions. Binders such as vinyl resins have been disadvantageous, because they contain liquid plasticizers (DOP) that are gradually lost by vaporization. As a result, tiles made with vinyl resin binders become embrittled and lose their properties of flexibility and abrasion resistance.

It has now been discovered that tough, hard floor tile compositions can be made using a binder composite of polybutene-1 and polypropylene or butene-1-ethylene copolymer or both.

Accordingly, it is a broad object of this invention to provide novel floor covering compositions. Another object is to provide tough, hard floor tiles and the like. A specific object is to provide a floor tile composition having a binder composite of polybutene-1 and polypropylene or a butene-1-ethylene copolymer, or both. Other objects and advantages of this invention will become apparent to those skilled in the art from the following detailed description.

In general, this invention provides a floor tile composition that comprises, by weight, between about 60 percent and about 85 percent fillers, fibrous matter, and pigments and between about 40 percent and about 15 percent binder; said binder being a blend of polybutene-1 with at least one material selected from the group consisting of polypropylene and butene-1-ethylene copolymer containing 1–30 weight percent ethylene, and said binder containing between about 5 and about 95 weight percent polybutene-1, between about 5 and about 50 weight percent polypropylene when used, and between about 95 and about 5 weight percent of said butene-1-ethylene copolymer when used.

The invention also provides molded floor tiles and the like produced from the aforedescribed composition, which have abrasion resistance superior to those made with polyvinylchloride resin binders.

The polybutene-1 component of the binder used in the floor tile compositions of this invention is a highly stereoregular polymer of butene-1, having a high degree of stereoregularity, i.e., tacticity. Polybutene-1 is produced, as is well known to those skilled in the art, by the polymerization of butene-1 in the presence of stereospecific catalyst systems, such as titanium trichloride and diethylaluminum halide. Procedures for producing the stereoregular polymers of butene-1 are extensively described in the art. A particularly feasible method for making stereoregular polybutene-1 is described in copending application Ser. No. 375,061, filed June 15, 1964, now abandoned, and Ser. No. 453,599, filed May 6, 1965, now U.S. 3,362,940 a continuation-in-part thereof, and reference is made thereto for such preparation.

The polypropylene component of the binder, if used in the floor tile compositions of this invention, is highly stereoregular polypropylene. Stereoregular polypropylene is produced, as is well known in the art, by polymerizing propylene in the presence of stereospecific catalyst systems.

The butene-1-ethylene copolymer, which may be used in the floor tile compositions of this invention, are copolymers of ethylene and butene-1 containing between about one and about 30 weight percent ethylene. This copolymer is one containing lengthy sequences of polybutene-1 followed by random but shorter methylene sequences. These copolymers can be produced by copolymerizing butene-1 and ethylene in the presence of stereospecific polymerization catalysts. A particularly feasible process for preparing them is described in copending application Ser. No. 453,599, filed May 6, 1965, now U.S. 3,362,940.

The polybutene-1-ethylene copolymer appears to act as a plasticizer for the major polybutene-1 component and polypropylene component of the binder. Consequently, when the polybutene-1-ethylene copolymer is incorporated into the binder, it remains in the binder and is not lost by evaporation or diffusion. Thus, there is no loss of floor tile properties attributable to embrittlement because of plasticizer loss. Indeed, the binders of this invention are free from embrittlement problems, because all components are polymeric and, thus, not vaporizable. Furthermore, all components form polymeric crystals of a melting point sufficiently high to result in little change in modulus with temperature within the temperature range of interest for floor covering application. It has also been observed that penetrometer readings are relatively independent of temperature up to at least 115° F.

The binders utilized in the floor tile compositions of this invention are based upon blends of polybutene-1 with polypropylene, or with a copolymer of butene-1 and ethylene, or with both polypropylene and butene-1-ethylene copolymer. The binder can be produced in several ways. It can be a blend of between about 50 and about 95 weight percent polybutene-1 and between about 50 and about 5 weight percent polypropylene. Alternatively, it can be a blend of between about 5 and about 95 weight percent polybutene-1 and between about 95 and about 5 weight percent butene-1-ethylene copolymer. In the grand total of the binder components, of course totaling to 100 weight percent, the binder will contain between about 5 and about 95 weight percent polybutene-1, between about 5 and about 50 weight percent polypropylene, and between about 95 and about 5 weight percent of the aforedescribed butene-1-ethylene copolymer.

One or more fillers are used in the present floor tile compositions to create bulk, and increase hardness and resistance to indentation, heat, water, and chemicals. Non-limiting examples of fillers that are utilizable are graphite, diatomite, clays, quartz, sand, metal powder, metal oxides, calcium carbonate and the like, wood flour, marble flour, sawdust, mica, ground cork, wood pulp, walnut shell flour, and chalk. For the general purpose of enhancing appearance, pigments can be included in the floor tile composition. Some materials, such as metal oxides, which are classed as fillers, are also pigments. Accordingly, within the contemplation of this invention, the filler content of the composition can include, at least in part, pigments. The pigments can be inorganic or organic materials that are insoluble in the resin and elastomer. As is well known in the art, pigments are obtained from numerous sources, including salts, metal oxides, azo compounds, nitro compounds, anthroquinones, and indigos. Typical pigments include lithopone, titanium dioxide, zinc oxide burnt sienna, ferric oxide, red lead, raw umber, yellow ocher, lead chromate, chrome orange, chrome green, ultramarine blue, Pigment Chlorine GG, Lithol Fast Yellow GG, Toluidine Red R, O-Chloronitroaniline Red, Orange GG, Yellow R, Benzidine Yellow, Malachite Green, Methyl Violet B, Rhodamine B, Lake Red D, Naphthol Green B, and Alizarin. Many other pigments are well known in the art and are contemplated herein.

For purposes of strengthening and reinforcing the floor tile and enhancing dimensional stability and impact strength, fibers are included. Typical fibers that can be used are wood fibers, cotton fibers, glass fibers, hemp, asbestos, wood pulp, and synthetic fibers, such as nylon, Orlon, Dacron and the like. The amount of fillers, pigments, and fibrous matter included in the floor tile composition will be between about 60 and about 85 weight percent.

As is well known to those familiar with the art, some polyolefins are incompatible with certain other polyolefins. For example, isotactic polypropylene is incompatible with linear polyethylene and blends thereof have lower tensile strength and show loss of optical clarity. In an effort to produce sufficiently homogeneous blends of these polymers, resort has been had to special processing techniques, such as shock cooling a melted blend of the polymers.

Surprisingly, the polymer components of the binder blend of this invention are quite compatible. These binder blends retain high tensile properties and, insofar as is apparent to the eye, loss of optical properties is practically negligible. Accordingly, it is not necessary to resort to special blending and processing techniques to produce practically homogeneous blends of the polymer components. The components are simply blended by masticating, for example, on a slightly warm differential-speed 2-roll mill or in similar polymer blending machinery, such as a Banbury mill. The polymer components can be first blended, followed by blending in of the fibers, fillers, and pigments, or all ingredients can be blended in one operation. The blend then molded by conventional methods to form the tile.

The molding composition of this invention has been described with particular reference to floor tiles. Such tiles can be molded into various shapes and sizes, including the usual 9 in. x 9 in. tile. The composition can be molded into sheets. Such sheets can be used to cover large areas of floor surface. It is also within the contemplation of this invention to use the molded sheets for other applications wherein hardness and strength are desired. Thus, for example, they can be used for covering tables, counter tops, and the like.

Examples 1 through 3

A binder was prepared by blending on a differential speed two roll mill 25 weight percent polypropylene (95% isotactic, M.I.=0.2, and M.P.=170° C.) with 75 weight percent polybutene-1 (95% isotactic, M.I.=0.2, and M.P.=125° C.). Floor tile compositions were prepared by blending portions of this binder with varying amounts of fiber, filler, and pigment by weight, as set forth in the table, and forming the compositions into tiles. Each tile was tested for abrasion resistance and for Rockwell hardness.

For comparison purposes, vinyl (polyvinylchloride binder) tile prepared in the laboratory and a commercial vinyl (polyvinylchloride binder) tile were also tested. Pertinent data are set forth in the table.

TABLE

| Material | Abrasion, gms. lost | | Rockwell hardness |
|---|---|---|---|
|  | 250 turns | 750 turns |  |
| Vinyl tile (pressed) | .20 | .55 | 60 |
| Vinyl tile (commercial) | .41 | .60 |  |
| Example 1 | .12 | .25 | 62 |
|   Binder, 27% |  |  |  |
|   Asbestos, 65% |  |  |  |
|   $CaCO_3$, 5% |  |  |  |
|   $TiO_2$, 3% |  |  |  |
| Example 2 | .13 | .16 | 76 |
|   Binder, 25% |  |  |  |
|   Asbestos, 65% |  |  |  |
|   $CaCO_3$, 8% |  |  |  |
|   $TiO_2$, 2% |  |  |  |
| Example 3 | .11 | .19 | 60 |
|   Binder, 27% |  |  |  |
|   Asbestos, 40% |  |  |  |
|   $CaCO_3$, 30% |  |  |  |
|   $TiO_2$, 3% |  |  |  |

As will be apparent from the data in the table, the floor tile compositions of this invention are superior to vinyl tiles in abrasion resistance. They are also at least equal to and often superior to, vinyl tiles in hardness. It has also been found that the binder blends are capable of a much higher loading of fillers, fibers, and pigments than are the polyvinylchloride binders.

Other floor tile compositions within the scope of this invention, using other binder blends and fillers, are also superior in abrasion resistance and highly satisfactory with respect to hardness. Typical compositions are illustrated in the following examples.

Examples 4 through 7

Compositions using blends of isotactic polybutene-1 and isotactic butene-1-ethylene copolymer (about 10 wt. percent ethylene) are as follows, all values being in weight percent:

| Component | Example | | | |
|---|---|---|---|---|
|  | 4 | 5 | 6 | 7 |
| Polybutene-1 | 21.0 | 13.5 | 4.0 | 10.0 |
| Polybutene-1-ethylene | 6.0 | 13.5 | 16.0 | 10.0 |
| Asbestos | 58 | 58 | 60 | 60 |
| $CaCO_3$ | 13 | 13 | 18 | 18 |
| $TiO_2$ | 2 | 2 | 2 | 2 |

Examples 8 through 11

Compositions using blends of all three components, isotactic polybutene-1, isotactic polypropylene, and isotactic butene-1-ethylene copolymer (about 10 wt. percent ethylene) are as follows, all values being in weight percent:

| Component | Example | | | |
|---|---|---|---|---|
|  | 8 | 9 | 10 | 11 |
| Polybutene-1 | 4.5 | 10.0 | 3.0 | 7.5 |
| Polypropylene | 1.5 | 3.5 | 1.0 | 2.5 |
| Polybutene-1-ethylene | 21.0 | 13.5 | 16.0 | 10.0 |
| Asbestos | 58 | 58 | 60 | 60 |
| $CaCO_3$ | 13 | 13 | 18 | 18 |
| $TiO_2$ | 2 | 2 | 2 | 2 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A molding composition that comprises, by weight, between about 60 percent and about 85 percent fillers, fibrous matter, and pigments and between about 40 percent and about 15 percent binder; said binder being a blend of stereoregular polybutene-1 with a stereoregular copolymer of butene-1 and ethylene containing 1–30 weight percent ethylene and said binder containing between about 5 and about 95 weight percent polybutene-1 and between about 95 and about 5 weight percent of said copolymer.

2. A molding composition that comprises, by weight, between about 60 percent and about 85 percent fillers, fibrous matter, and pigments and between about 40 percent and about 15 percent binder; said binder being a blend of stereoregular polybutene-1, a stereoregular copolymer of butene-1 and ethylene containing 1–30 weight percent ethylene, and stereoregular polypropylene, and said binder containing between about 5 and about 95 weight percent polybuene-1, between about 5 and about 50 weight percent polypropylene, and between about 95 and about 5 weight percent of said copolymer.

3. Molded floor tiles molded from the molding composition defined in claim 2, which have abrasion resistance superior to those made with polyvinylchloride resin binders.

4. Molded floor tiles molded from the molding composition defined in claim 3, which have abrasion resistance superior to those made with polyvinylchloride resin binders.

References Cited

UNITED STATES PATENTS

| 3,070,557 | 12/1962 | Gessler et al. | 260—41 XR |
| 3,072,593 | 1/1963 | Marx et al. | 260—41 XR |

FOREIGN PATENTS

| 226,106 | 12/1959 | Australia. |
| 623,729 | 4/1963 | Belgium. |
| 675,907 | 12/1963 | Canada. |
| 1,020,012 | 2/1966 | Great Britain. |

MORRIS LIEBMAN, *Primary Examiner.*

J. H. DERRINGTON, *Assistant Examiner.*

U.S. Cl. X.R.

260—897